Figure 1:
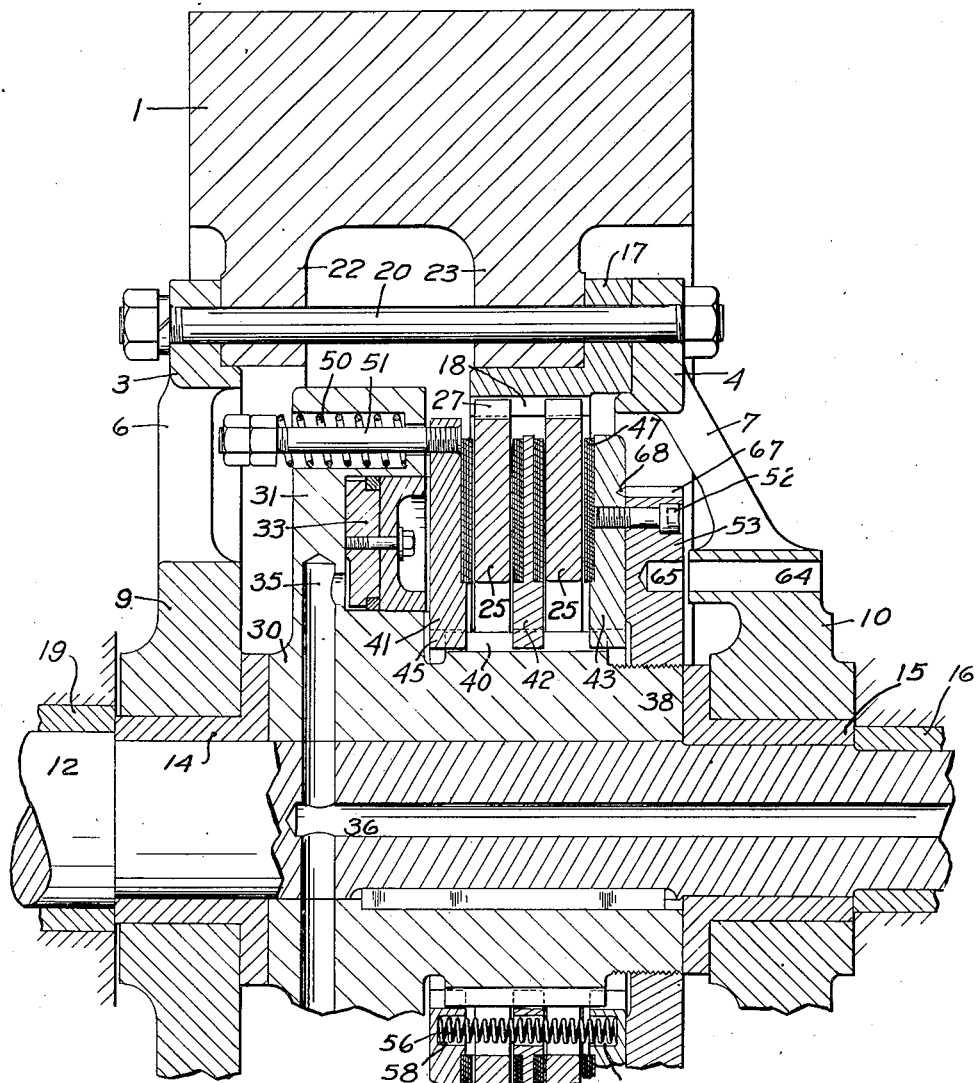

July 19, 1938.  W. W. CRILEY  2,123,867

FLUID OPERATED CLUTCH

Filed April 3, 1936

INVENTOR.
WILLIAM W. CRILEY
BY Justus Macklin
ATTORNEY.

Patented July 19, 1938

2,123,867

UNITED STATES PATENT OFFICE 2,123,867

FLUID OPERATED CLUTCH

William W. Criley, Cleveland, Ohio

Application April 3, 1936, Serial No. 72,453

2 Claims. (Cl. 192—85)

This invention relates to an improvement in a fluid operated clutch of the friction disk type which is adapted for use for driving presses, forging machines and other heavy duty machinery and which is designed to operate intermittently over long periods of time.

For such machines it is desirable to have a more accurate and a quicker method of adjusting the clutch plates. In the clutches such as shown in my Patent No. 1,968,129, the plate adjustment is accomplished by turning a number of adjusting screws, which are mounted on the flywheel and which act on the friction plates.

The principal object, therefore, of the present invention, lies in the provision of an improved means for quickly, accurately and effectively adjusting the clearance between the friction plates of a power operated clutch.

Another important object is to provide a power operated clutch in which the clutch engaging pressure is sustained within the driven element, thus relieving the clutch supporting bearings from a heavy thrust load.

Another object of the present invention is to provide a clutch of friction plate and quick-action type which comprises relatively few parts and which can be made at less cost than other clutches designed for the same purpose.

Another object is the provision of a clutch in which the operating members are carried by the intermittently driven element with effective provision for tight joints for the fluid conducting passages between relatively moving parts.

Still another object of the present invention lies in the provision of a pneumatic operated clutch which may be mounted between the shaft supporting bearings.

A further object is the provision for quickly releasing the pressure engagement of the friction disks when the operating fluid pressure is released.

Other objects will become apparent from the following description which relates to the accompanying drawing.

In the drawing,—

Figure 2:
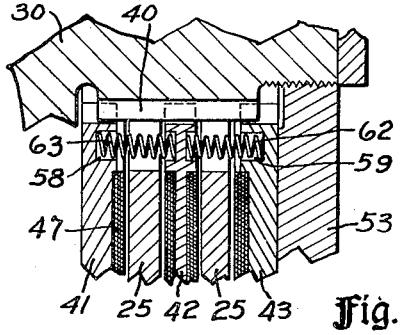

Fig. 1 illustrates a fragmentary radial sectional view showing a preferred embodiment of the present invention, and Fig. 2 is a modified arrangement of the clutch release.

Referring to the drawing, the reference numeral 1 indicates an inertia driving member in the form of a rim which may be carried by side wheel members 3 and 4 each having spokes 6 and 7 and hub portions 9 and 10, and each suitably journaled to a driven shaft member 12 through bearings 14 and 15 respectively. The shaft 12 is preferably mounted on the frame in bearings 16 and 19 which are spaced to support the shaft on both sides of the rim 1 and adjacent each of the side wheel members 3 and 4.

Fitted to the inner periphery of the rim is a flanged driving ring as at 17 having spline-like teeth 18 formed on the inner surface thereof.

The wheel members 3 and 4 and the driving ring 17 are preferably secured to the rim 1 as by bolts 20 which extend through suitable aligned openings in flanged portions 22 and 23 on the rim and also through openings in the driving ring 17 and wheel members 3 and 4.

The driving plates, indicated at 25, are provided with complementary teeth 27 on the outer periphery thereof which fit between and engage the spline teeth 18 on the driving ring 17.

A hub member 30 is shown keyed to the shaft 12 and has a radial flange at 31 which is adapted to carry a ring piston 33 axially movable within an inwardly opening annular recess. Piston actuating fluid reaches the piston through radial fluid conducting passages 35 and an axial passage 36 in the shaft member 12. The radial flange 31 provides a rigid abutment against which the piston actuating fluid reacts when it is admitted to the annular recess. A sleeve portion 38 of the hub member 30 is provided at its outer surface with notches as at 40 which drivingly connect friction disk plates 41, 42, 43, through complementary engaging teeth 45 formed on the inner circumference thereof.

The plates 41, 42, 43 are provided with the usual friction facing indicated at 47 adapted to engage the driving plates 25.

Plate 41 is normally held disengaged from the plate 25 by coil compression springs 50 which may be recessed in the outer face of flange 31 and which react against the heads or nuts of bolts 51 threaded or otherwise secured to the plate 41.

The plate 43 may be made rigid through a locking screw as at 52 with a retainer or reaction ring member 53 which is preferably threaded to the outer end of the sleeve portion 38 to provide a means of adjusting the clutch and also to carry the force required to engage the clutch.

It will be noted that the ring member 53 and the radial flange 31 are attached to the same hub member 30 and that the member 53 is axially spaced from the flange 31 so that the flange 31 and member 53 provide spaced abutments between which the group of friction plates are accommodated. The ring member 53 provides an adjustable abutment against which the pressure applied to the piston and friction plates reacts.

In operation, air under pressure, for example, from 50 to 150 pounds per square inch, is admitted through the axial passage 36 and radial passages 35 to the annular recess and behind the piston 33 which is urged thereby toward the open end of the recess to engage and move the plate 41 and cause frictional contact of the driving plates 25 with the driven plates 41, 42 and 43.

Upon release of the air pressure in passage 36 and 35 the spring 50 retracts the plate 41 to permit disengagement from one of the plates 25.

As a means to further insure immediate disengagement of the plates after the air pressure is released, compression springs 56 may be positioned intermediate the plates 41 and 43 and located within suitable recesses as at 58 and 59 in the plates 41 and 43 respectively which, upon expansion, cause separation of said plates from plates 25.

Each of the single springs 56 may be replaced by shorter springs as at 62 and 63 of substantially the same modulus to react between alternate plates as shown in the modification in Fig. 2.

Adjustment of the clutch, to compensate for wear or other alterations, may be made in the following manner.

The locking screw 52 is first removed from engagement with the plate 43 and ring 53 to allow relative rotation therebetween. Then the opening indicated at 64, in the hub of the wheel member 4, is brought into registration with a hole 65 in the ring 53 so that a bar may be inserted therein to temporarily connect or key the wheel member 4 to the ring 53. Then by producing relative rotation between the driving elements and driven hub member 30 the ring 53 is caused to move axially along the threads on the sleeve portion 38 to change the clearance between the driving and driven plates to the desired amount.

To facilitate the alignment of any two locking screw openings an indicating notch as at 67 on the ring 53 is brought into registration with a mark, such as a depression 68, on the plate 43. This alignment may be most easily accomplished by placing a tool in the notch 67 so that one end will drop into the depression 68 when the plates are in the proper relative position. In this position the locking screw 52 is replaced in the openings to prevent subsequent relative turning between the plate 43 and the reaction ring 53.

While it is shown in the drawing that the reaction ring and the clutch actuating piston are mounted on the driven member it is apparent that other modifications of this arrangement such as placing the piston and an adjustable reaction ring on the driving member may be made without departing from the spirit and scope of the invention as defined in the appended claims.

Having thus described my invention, what I claim is:

1. In a clutch mechanism, a driving member, a driven member, friction plates carried by and rotatable with the members, respectively, said plates being movable axially relative to the members, means carried by one of said members for moving the plates axially into frictional engagement, a reaction collar coaxial with the plates and in threaded engagement with the said one of said members, said collar being connectible for rotation with the said one of said members and being selectively disconnectible therefrom for rotation relative thereto to effect adjustment axially, and said collar having a reaction surface operatively associated with the plates, and means for temporarily connecting the collar to the other of said members for rotation therewith when the collar is disconnected from the said one of the members, whereby the collar may be rotated relative to the said one of said members by the other member for effecting axial adjustment thereof.

2. An instantaneous and intermittent, heavy duty, fluid pressure operated, friction clutch mechanism comprising a rotatable shaft, spaced bearings rotatably supporting the shaft, a fly wheel member journaled at its ends on the shaft between said bearings, a hub member fixed to the shaft between the ends of the fly wheel member, the hub member having axially spaced abutments, said abutments being arranged for adjustment relatively toward and away from each other, annular friction clutch elements carried by the members, respectively, and coaxial therewith and disposed between said spaced abutments, one of said abutments having an annular cylinder coaxial with the shaft and opening toward the opposite abutment, an annular piston in said cylinder and operatively engaging the friction clutch elements for forcing them against the said opposite abutment when fluid pressure is admitted to the cylinder for effecting frictional engagement of the elements with each other to drivingly connect the members, whereby the reactance pressures of the cylinder and piston are confined to the hub member and the shaft and fly wheel member are supported beyond the opposite ends of the hub member, means for restoring the clutch elements to inoperative position consequent upon release of fluid pressure in the cylinder, and a fluid circuit connected to the cylinder and including a duct in the shaft and extending longitudinally thereof and a radial duct in the shaft and hub connecting the first mentioned duct to the cylinder, and said circuit being arranged for reversal of the flow of pressure fluid therein.

WILLIAM W. CRILEY.